Patented Nov. 15, 1938

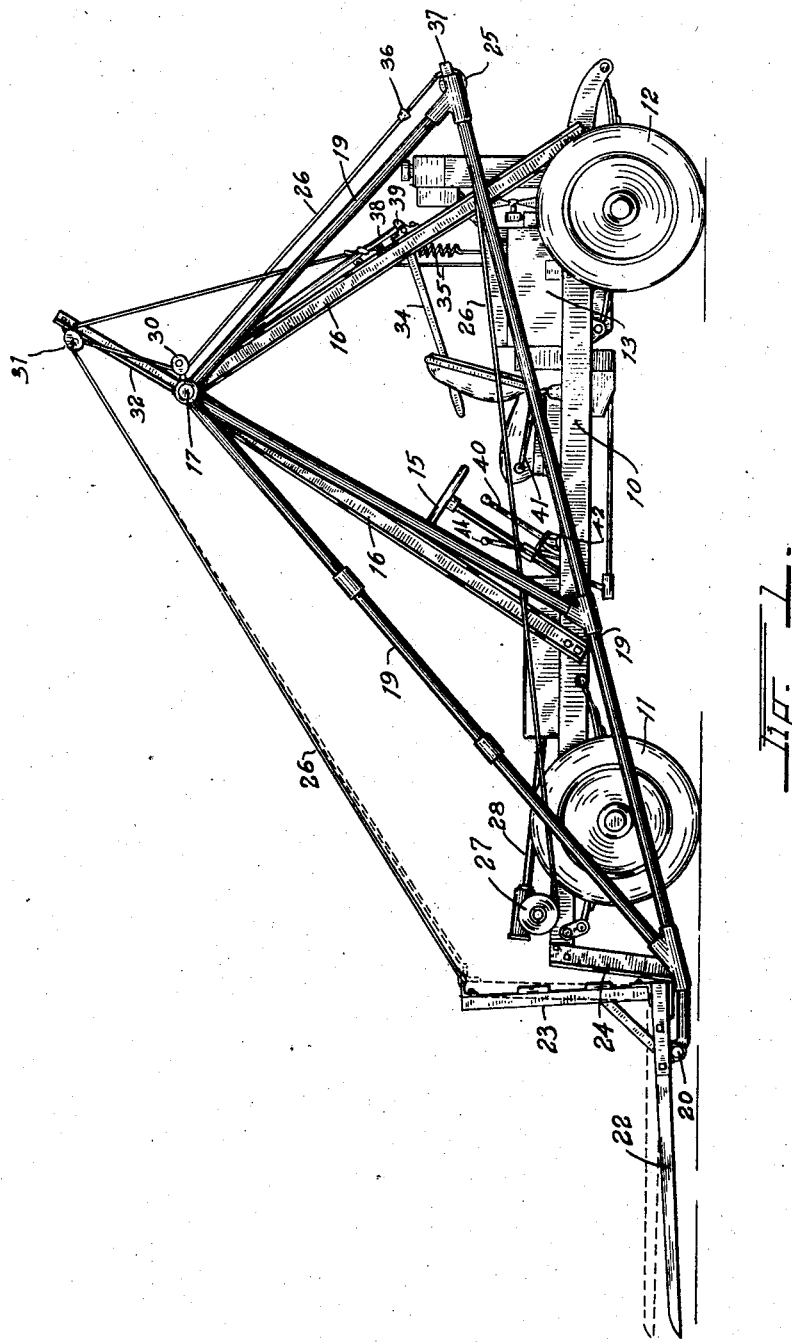

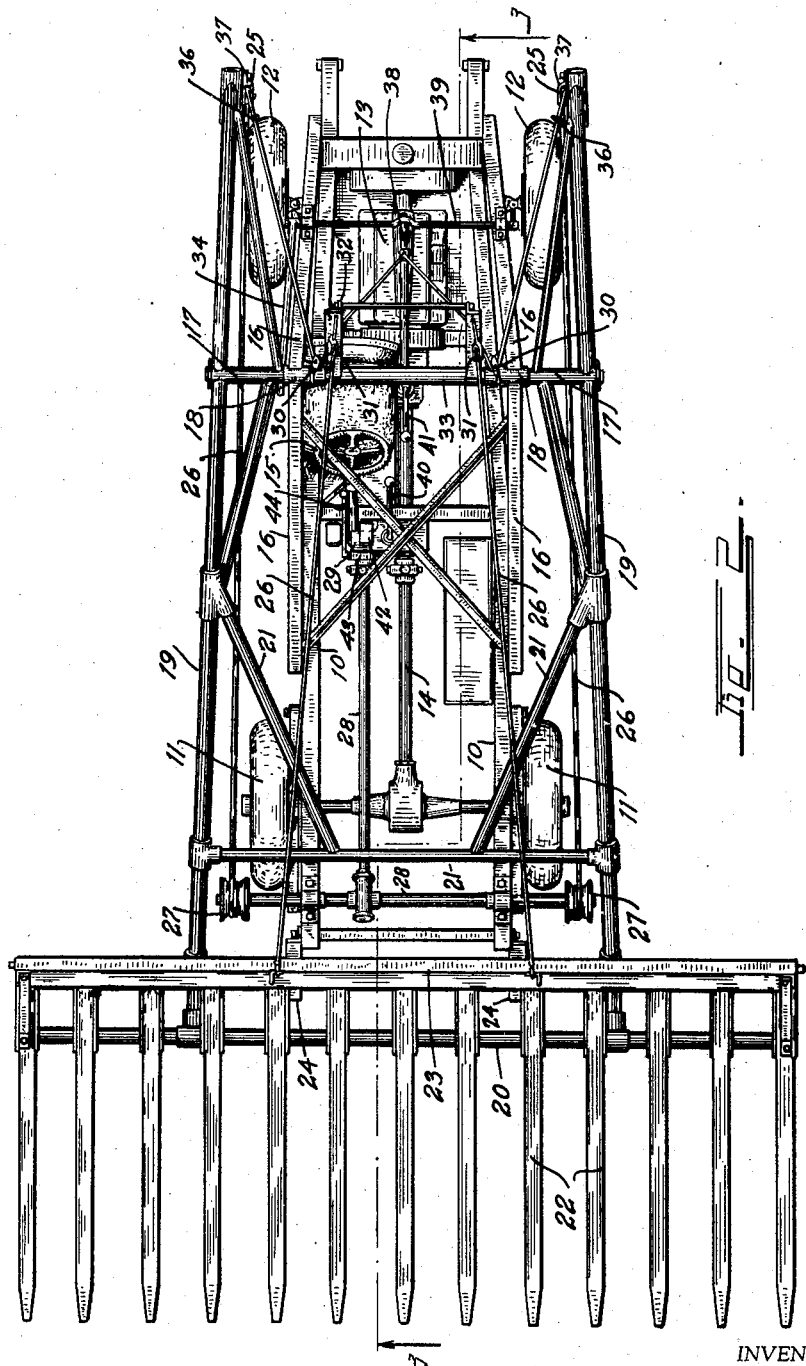

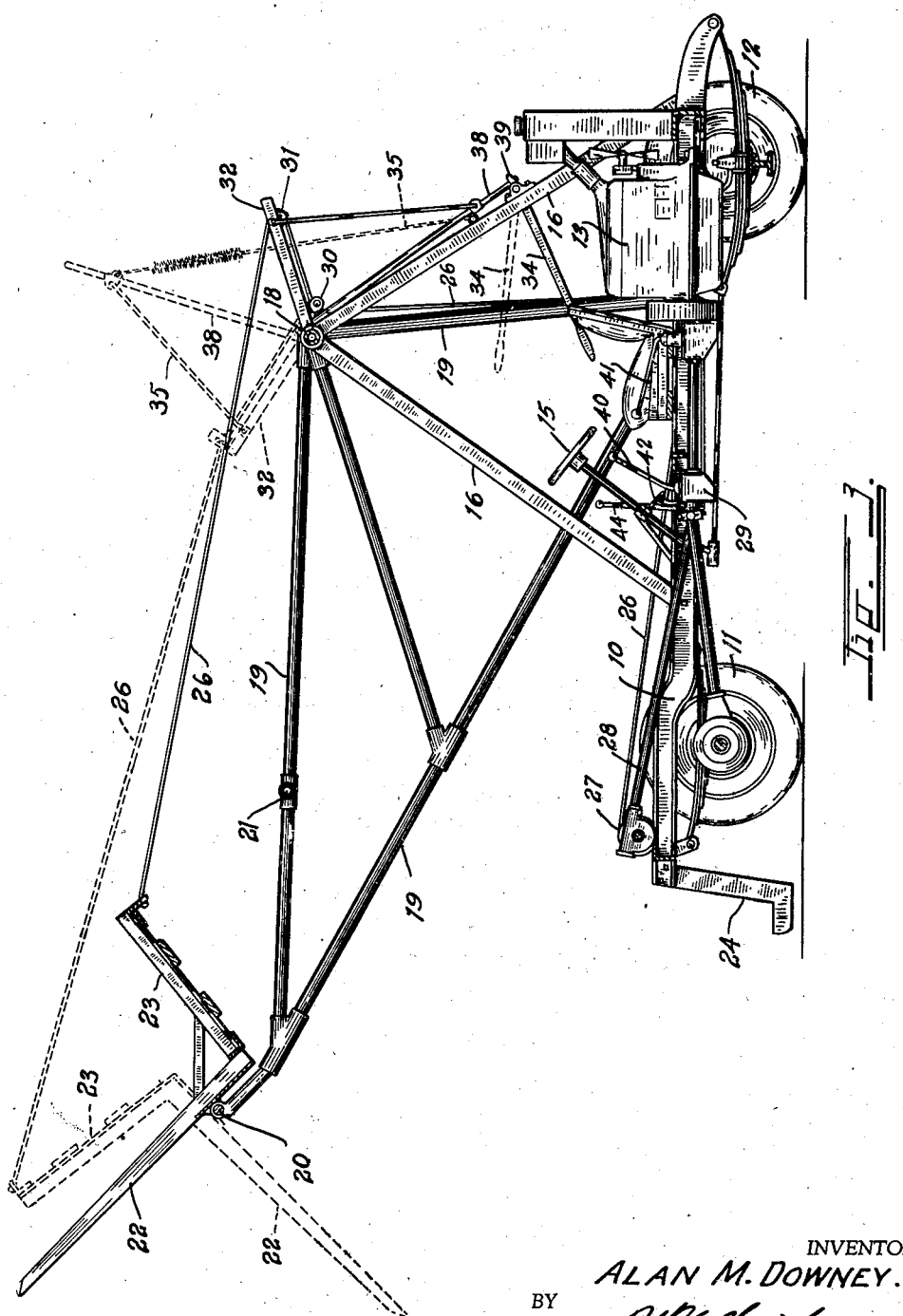

2,136,417

UNITED STATES PATENT OFFICE 2,136,417

COMBINATION BULL RAKE AND STACKER

Alan M. Downey, Glendo, Wyo.

Application November 2, 1937, Serial No. 172,332

4 Claims. (Cl. 214—140)

This invention relates to a combination hay sweep or bull rake and stacker and has as its principal object the provision of an efficient unit which can be used both as a bull rake and as a stacker and which will eliminate the usual stacker equipment.

Other objects of the invention are, to provide a self-propelled bull rake construction which can be accurately guided along the windrows, which will elevate the load above the ground for transportation without dragging, and which will elevate the load upon the stack; to provide a device which can be operated by a single man to accurately position the load at any desired point upon the stack; to provide a combination construction which will occupy no more ground space than the usual bull rake.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 1 is a side view of the improved bull rake and stacker in the raking position.

Fig. 2 is a plan view thereof.

Fig. 3 is a longitudinal section taken on the line 3—3, Fig. 2.

The invention comprises a chassis 10 mounted upon forward drive wheels 11 and rear guide wheels 12. The drive wheels 11 are driven from a suitable engine 13, through the medium of a drive shaft 14. The guide wheels 12 are controlled from a steering wheel 15. A stationary frame 16 is mounted on the chassis 10 and extends thereabove to support a rotatable tubular shaft 17. The frame 16 preferably consists of two A-shaped side frames each of which supports a tubular bearing 18 for the shaft 17.

The shaft 17 terminates at each extremity in a stacker frame 19. The frames 19 are secured to the shaft 17 so that they will move in unison and are connected at their forward extremities by means of a rake bar 20. They may be stiffened by means of suitable cross bracing 21 as required. The rake bar 20 extends across and is journaled beneath a series of bull rake teeth 22. The latter extend forwardly from a back frame 23 on the rake.

The rear extremity of the rake rests upon step members 24 carried on the forward extremity of the chassis 10. In the normal raking position the rake rests by gravity upon the step members 24 and the teeth are still further weighted by the weight of the rake bar 20 and the stacker frames 19.

The stacker frames 19 are triangular in shape, the shaft 17 being positioned at the upper apex of the triangle. This causes the rear extremities of the frames to extend rearwardly over each of which, an elevating cable 26 is trained. The cables 26 reel upon winch drums 27 at their forward extremities. The drums are driven from a winch shaft 28 connected to the engine 13 through a suitable take-off transmission mechanism 29 controlled from a gear shift lever 40.

The cables 26 pass from the drums 27 rearwardly about the sheave wheels 25; thence upwardly about a second pair of sheave wheels 30 connected at the shaft 17; thence over a third pair of sheave wheels 31 to the upper edge of the rake frame 23.

The third pair of sheave wheels is carried on an L tripping frame 32, mounted on a rotatable sleeve 33 surrounding the shaft 17. The tripping frame 32 comprises two upwardly projecting arms, to which the sheaves 31 are connected and a downward and rearwardly projecting locking arm 38. The tripping frame is held in the position of Fig. 1 by means of a locking shaft 39 which is to form a crank-like portion at its middle which passes over the end of the locking arm 38. The locking shaft can be rotated by means of a tripping lever 34. When the lever 34 is lifted, it releases the arm 38 allowing the frame 32 to swing to the broken line position of Fig. 3. The tripping frame may be returned to its original position by means of a pull rope 35.

In operation, the driver drives the rake along the windrows with the teeth in the solid line position of Fig. 1. When he has picked up a full load he starts the drums 27 and winds in sufficient cable to lift the rake teeth to the broken line position of Fig. 1. This elevates the load from the ground so that it may be easily transported to the stack without dragging upon the ground. When the teeth are in the elevated, transportation position, stop members 36 on each cable 26 will have reached guides 37 on the sheaves 25. This prevents further cable from being drawn around the sheaves 25.

When the stack is reached, or while it is being approached, the drums 27 are again rotated, causing the cables 26 to pull the rear extremities of frame 19 forwardly to elevate the load as shown in Fig. 3. When the desired elevation is reached and the load is properly positioned over the stack, the trip lever 34 is lifted. This causes the locking shaft 39 to release the locking arm 38 so that the trip frame will rotate to the broken line position of Fig. 3. This slackens the cables between the sheaves 25 and the rake, allowing the latter to tip forwardly to slide the load onto the stack. After the rake has been elevated, the machine can be driven in close against the stack to position the load over the top thereof if desired.

The usual automobile gear shift lever is illustrated at 41 and the engine is equipped with the usual control clutch controlled by means of the usual clutch pedal 42. If the clutch is engaged when the lever 41 is in gear, the entire machine will be propelled over the ground. If engaged when the lever 40 is in gear, the drums 27 will be rotated. Both of these functions may be accomplished simultaneously if desired. The rake can be lowered by gravity by simply releasing the clutch or it can be lowered by shifting the gear set into "reverse".

By having the guide wheels positioned at the rear, the entire machine can be turned in a very small radius so that accurate steering control is had at all times.

A brake drum 43 may be provided on the shaft 28 controlled by means of a brake lever 44. The gear shift 40 can then be released and the rake lowered to raking position by controlling the brake 43.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A portable stacker comprising a wheeled chassis; a vertical frame member rising from each side of said wheeled chassis; a horizontal shaft journalled between said vertical frame members and extending across said chassis; a triangular frame secured on and depending from each extremity of said shaft, said shaft being positioned at the apex of said triangular frames so that the latter will project forwardly and rearwardly below said shaft; a rake shaft connecting the forward extremities ahead of said chassis; a rake journalled upon said rake shaft and projecting forwardly thereof; an upstanding back frame on said rake; a cable drum positioned forwardly on said chassis; a first pair of cable sheaves at the rearward extremities of said triangular frames; a second pair of cable sheaves positioned adjacent said horizontal shaft; and a pair of cables extending from said cable drum rearwardly over said first pair of sheaves, thence upwardly to said second pair of sheaves; thence forwardly to the back frame of said rake.

2. A portable stacker comprising a wheeled chassis; a vertical frame member rising from each side of said wheeled chasses; a horizontal shaft journalled between said vertical frame members and extending across said chassis; a triangular frame secured on and depending from each extremity of said shaft, said shaft being positioned at the apex of said triangular frames so that the latter will project forwardly and rearwardly below said shaft; a rake shaft connecting the forward extremities ahead of said chassis; a rake journalled upon said rake shaft and projecting forwardly thereof; an upstanding back frame on said rake; a cable drum positioned forwardly on said chassis; a first pair of cable sheaves at the rearward extremities of said triangular frames; a second pair of cable sheaves positioned adjacent said horizontal shaft; a pair of cables extending from said cable drum rearwardly over said first pair of sheaves, thence upwardly to said second pair of sheaves; thence forwardly to the back frame of said rake; and means for limiting the movement of said cables over said first pair of sheaves so that the remaining movement thereof will swing said triangular frames forwardly to elevate said rake.

3. A portable stacker comprising a wheeled chassis; a vertical frame member rising from each side of said wheeled chassis; a horizontal shaft journalled between said vertical frame members and extending across said chassis; a triangular frame secured on and depending from each extremity of said shaft, said shaft being positioned at the apex of said triangular frames so that the latter will project forwardly and rearwardly below said shaft; a rake shaft connecting the forward extremities ahead of said chassis; a rake journalled upon said rake shaft and projecting forwardly thereof; an upstanding back frame on said rake; a cable drum positioned forwardly on said chassis; a first pair of cable sheaves at the rearward extremities of said triangular frames; a second pair of cable sheaves positioned adjacent said horizontal shaft; a pair of cables extending from said cable drum rearwardly over said first pair of sheaves, thence upwardly to said second pair of sheaves; thence forwardly to the back frame of said rake; means for limiting the movement of said cables over said first pair of sheaves so that the remaining movement thereof will swing said triagular frames forwardly to elevate said rake; and means for slackening said cables between said first sheaves and said back frame to allow said rake to tilt forwardly and downwardly.

4. A portable stacker comprising a wheeled chassis; a vertical frame member rising from each side of said wheeled chassis; a horizontal shaft journalled between said vertical frame members and extending across said chassis; a triangular frame secured on and depending from each extremity of said shaft, said shaft being positioned at the apex of said triangular frames so that the latter will project forwardly and rearwardly below said shaft; a rake shaft connecting the forward extremities ahead of said chassis; a rake journalled upon said rake shaft and projecting forwardly thereof; an upstanding back frame on said rake; a cable drum positioned forwardly on said chassis; a first pair of cable sheaves at the rearward extremities of said triangular frames; a second pair of cable sheaves positioned adjacent said horizontal shaft; a tripping frame rotatably mounted on said horizontal shaft; a third pair of cable sheaves supported above said horizontal shaft on said tripping frame; a pair of cables extending from said cable drum rearwardly above the first pair of sheaves, upwardly about the second pair, rearwardly and upwardly about the third pair, thence forwardly to the back frame of the rake; means for allowing but a limited movement of the cables over the first pair of sheaves; and means for releasing said tripping frame so that it may swing forward to slacken said cables and allow said rake to tilt.

ALAN M. DOWNEY.